US008711165B2

(12) United States Patent  
Ota

(10) Patent No.: US 8,711,165 B2  
(45) Date of Patent: Apr. 29, 2014

(54) IMAGE PROCESSING APPARATUS, IMAGE DISPLAY APPARATUS, AND IMAGE PROCESSING METHOD

(75) Inventor: Katsuya Ota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 12/961,769

(22) Filed: Dec. 7, 2010

(65) Prior Publication Data

US 2011/0134135 A1 Jun. 9, 2011

(30) Foreign Application Priority Data

Dec. 9, 2009 (JP) ................................. 2009-279271

(51) Int. Cl.
*G06G 5/00* (2006.01)
*G09G 5/00* (2006.01)
*G09G 5/02* (2006.01)

(52) U.S. Cl.
USPC ............................ 345/581; 345/614; 345/698

(58) Field of Classification Search
USPC ......................................................... 345/581
See application file for complete search history.

(56) References Cited

U.S. PATENT DOCUMENTS

| 6,870,547 B1 * | 3/2005 | Crosby et al. ................. 345/619 |
| 7,027,016 B2 * | 4/2006 | Sakashita ........................ 345/84 |
| 7,440,029 B2 | 10/2008 | Kondo et al. |
| 8,253,752 B2 * | 8/2012 | Raveendran ................... 345/581 |
| 2009/0009660 A1 | 1/2009 | Kageyama et al. |

FOREIGN PATENT DOCUMENTS

| CN | 1615011 A | 5/2005 |
| CN | 101140625 A | 3/2008 |
| JP | A-2009-15025 | 1/2009 |

* cited by examiner

*Primary Examiner* — Ke Xiao  
*Assistant Examiner* — Kwang Lee  
(74) *Attorney, Agent, or Firm* — Oliff PLC

(57) ABSTRACT

An image processing apparatus includes: an image quality improvement processing unit which is supplied with an image signal corresponding to an original image from an image supply device, executes image quality improvement processing to first image data based on the image signal and thus generates second image data; a resolution deciding unit which compares the first image data with the second image data and thus decides resolution of the original image; and a control unit which controls the image quality improvement processing unit according to the resolution of the original image decided by the resolution deciding unit and thus adjusts the image quality improvement processing.

9 Claims, 4 Drawing Sheets

IMAGE PROCESSING APPARATUS, IMAGE DISPLAY APPARATUS, AND IMAGE PROCESSING METHOD

CROSS REFERENCE

The entire disclosure of Japanese Patent Application No. 2009-279271, filed Dec. 9, 2009 is expressly incorporated herein by reference.

BACKGROUND

1. Technical Field

The present invention relates to an image processing apparatus, an image display apparatus, and an image processing method.

2. Related Art

In the case where an image display apparatus such as a projector displays an image, image processing such as scaling and image quality improvement processing is executed to an inputted image signal and an image in the state where the execution of the image processing is executed is displayed. However, in general, the image display apparatus does not determine whether the inputted image signal is an image signal that is up-converted or a high-definition (HD) signal (Hi-Vision video signal) that is not up-converted. Therefore, for example, in the case where an image signal of 1080 p is inputted, the image display apparatus executes image processing irrespective of the resolution of the original image expressed by this image signal and therefore appropriate image processing cannot be executed in some cases.

Specifically, for example, in the case of an image signal of 1080 p inputted to the image display apparatus, this image signal may be an image signal that is up-converted from an image signal of 480 p, or may be an HD signal that is not up-converted. For an up-converted image signal, its original image generally has low resolution and lacks high-frequency components. Therefore, when the image display apparatus executes image processing corresponding to the HD signal, appropriate effects cannot be achieved. Meanwhile, when the image display apparatus executes image processing corresponding to a standard-definition (SD) signal (standard video signal), appropriate effects cannot be achieved if the actual image signal is an HD signal.

For example, JP-A-2009-15025 describes a technique in which, based on the data volume after executing high-pass filter processing to image data of plural image frames, it is determined whether or not the plural image frames are image frames converted from image frames having a second number of pixels that is smaller than a first number of pixels.

However, in the technique described in JP-A-2009-15025, high-pass filter processing in the horizontal and the vertical directions to the image data of the plural image frames, enlargement rate determination processing in the horizontal direction and the vertical direction, and overall determination processing are executed. Therefore, it takes time to acquire the results of the determinations. Moreover, in this technique, no feedback control is carried out and therefore sufficient effects may not be achieved even if image processing is executed according to the results of the determinations.

SUMMARY

An advantage of some aspects of the invention is to provide an image processing apparatus, an image display apparatus and an image processing method that enable execution of more appropriate image processing according to an image signal in a circumstance where an up-converted image signal can be inputted.

According to an aspect of the invention, an image processing apparatus includes: an image quality improvement processing unit which is supplied with an image signal corresponding to an original image from an image supply device, executes image quality improvement processing to first image data based on the image signal and thus generates second image data; a resolution deciding unit which compares the first image data with the second image data and thus decides resolution of the original image; and a control unit which controls the image quality improvement processing unit according to the resolution of the original image decided by the resolution deciding unit and thus adjusts the image quality improvement processing.

According to another aspect of the invention, an image display apparatus includes the image processing apparatus, and a display unit which displays an image in the state where the image quality improvement processing is executed.

According to still another aspect of the invention, an image processing method in an image processing apparatus including an image quality improvement processing unit which performs image quality improvement processing to inputted image data, includes: having an image signal corresponding to an original image supplied to the image quality improvement processing unit from an image supply device; executing the image quality improvement processing to first image data based on the image signal by the image quality improvement processing unit and thus generating second image data; comparing the first image data with the second image data and thus deciding resolution of the original image; and controlling the image quality improvement processing unit according to the decided resolution and thus adjusting the image quality improvement processing.

According to the aspects of the invention, in the image processing apparatus and the like, the image data before and after the image quality improvement processing are compared and thus the resolution of the original image is decided. The image quality improvement processing unit is controlled according to the decided resolution. Thus, more appropriate image processing can be executed according to an image signal in a circumstance where an up-converted image signal can be inputted.

The control unit may control the image quality improvement processing unit so as to use a parameter value corresponding to the resolution decided by the resolution deciding unit.

With this configuration, the image processing apparatus or the like uses the parameter value corresponding to the decided resolution and thus can execute more appropriate image processing according to an image signal.

The control unit may also perform feedback control of the image quality improvement processing unit by adjusting a parameter value of a target of use according to the result of the comparison between the first image data and the second image data by the resolution deciding unit.

With this configuration, the image processing apparatus or the like performs feedback control of the image quality improvement processing unit and thus can stabilize the output at the time of image processing even when the resolution of the original image changes.

The resolution deciding unit may determine whether a value representing a difference between a pixel value of a pixel group near the center of an image included in the first image data and a pixel value of a pixel group near the center of an image included in the second image data exceeds a threshold value or not. The resolution deciding unit may decide that the resolution of the original image is the resolution of an HD signal if the value representing the difference exceeds the threshold value. The resolution deciding unit may decide that the resolution is the resolution of an SD signal if the value representing the difference does not exceed the threshold value. The control unit may control the image quality improvement processing unit so as to use a parameter value for an HD signal if the resolution of the original image is the resolution of the HD signal, and to use a parameter value for an SD signal if the resolution of the original image is the resolution of the SD signal.

With this configuration, even in the case where, for example, an HD signal up-converted from an SD signal is inputted, the image processing apparatus or the like can use a parameter value for the original SD signal and thus can execute more appropriate image processing.

The image quality improvement processing unit may include a contour enhancement processing unit which executes contour enhancement processing. The contour enhancement processing unit may generate the second image data by executing the contour enhancement processing to the first image data.

With this configuration, the image processing apparatus or the like can appropriately determine the resolution of the original image by comparing the image data before and after the contour enhancement processing. Therefore, more appropriate image processing can be executed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments in which the invention is applied to a projector will be described with reference to the drawings. The following embodiments do not limit the contents of the invention described in the claims. Not all the components described in the following embodiments are essential as measures provided by the invention described in the claims.

First Embodiment

Figure 1:
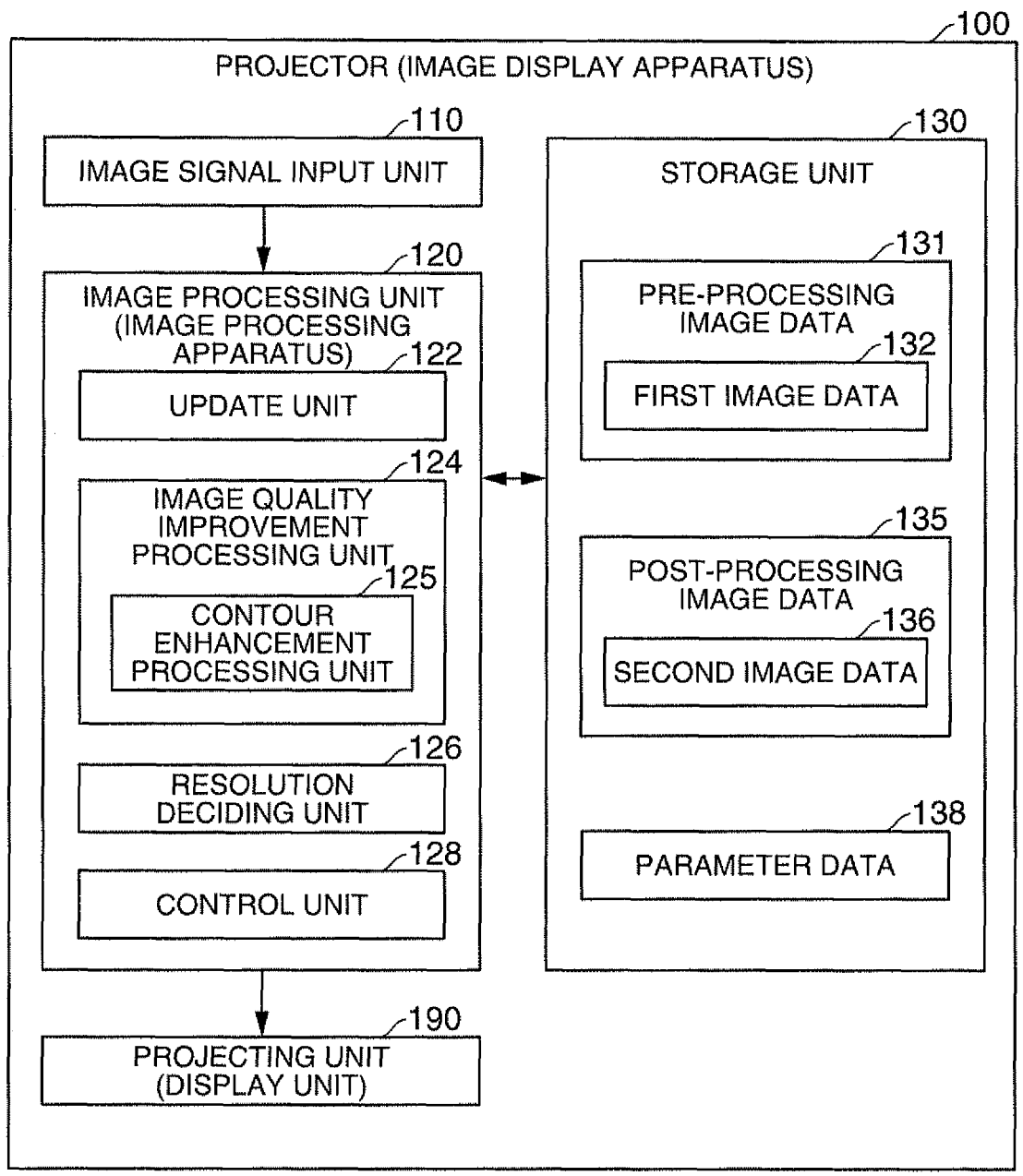
FIG. 1 is a functional block diagram showing a projector in a first embodiment.

FIG. 1 is a functional block diagram showing a projector 100 in a first embodiment. The projector 100 includes an image signal input unit 110 which inputs an image signal (which may be an image signal of dynamic image or an image signal of still image) from an image supply device such as a blue-ray disk player, an image processing unit 120 which executes various kinds of image processing, a storage unit 130 which stores various data, and a projecting unit 190 which generates and projects an image. The projecting unit 190 is a kind of display unit which displays an image in the state where image processing (image quality improvement processing or the like) is executed by the image processing unit 120.

The image processing unit 120 as a kind of image processing apparatus includes an update unit 122 which updates data in the storage unit 130, an image quality improvement processing unit 124, a resolution deciding unit 126 which decides what is the resolution of the original image in the image supply device (for example, the resolution of an image recorded on a blue-ray disk or the like), a control unit 128 which carries out various controls, and the like. The image quality improvement processing unit 124 includes a contour enhancement processing unit 125 and the like.

The storage unit 130 stores pre-processing image data 131 based on the image signal from the image signal input unit 110, post-processing image data 135 in the state where the processing by the contour enhancement processing unit 125 is executed to the pre-processing image data 131, parameter data 138 for the processing by the contour enhancement processing unit 125, and the like.

The parameter data 138 includes a coefficient of a differential filter corresponding to the resolution of an HD signal, as a parameter value for the HD signal. The parameter data 138 also includes a coefficient of a differential filter corresponding to the resolution of an SD signal, as a parameter value for the SD signal. Here, the differential filter is preferably such a filter that the sum of weights of target pixels becomes 0. For example, $\{-1, 2, -1\}$ as parameter values for the HD signal and $\{-1, -1, 4, -1, -1\}$ as parameter values for the SD signal can be employed. Combinations of filter coefficients are not limited to the above embodiment and various parameter values can be employed.

The pre-processing image data 131 includes first image data 132, which will be described later. The post-processing image data 135 includes second image data 136, which will be described later.

The projector 100 may also use the following hardware to function as each of these units. For example, in the projector 100, an image signal input terminal, a converter and the like may be used as the image signal input unit 110. A CPU, an image processing circuit and the like may be used as the image processing unit 120. A RAM or the like functioning as a frame memory may be used as the storage unit 130. A lamp, a liquid crystal panel, a liquid crystal driving circuit, a lens and the like may be used as the projecting unit 190.

Figure 2:
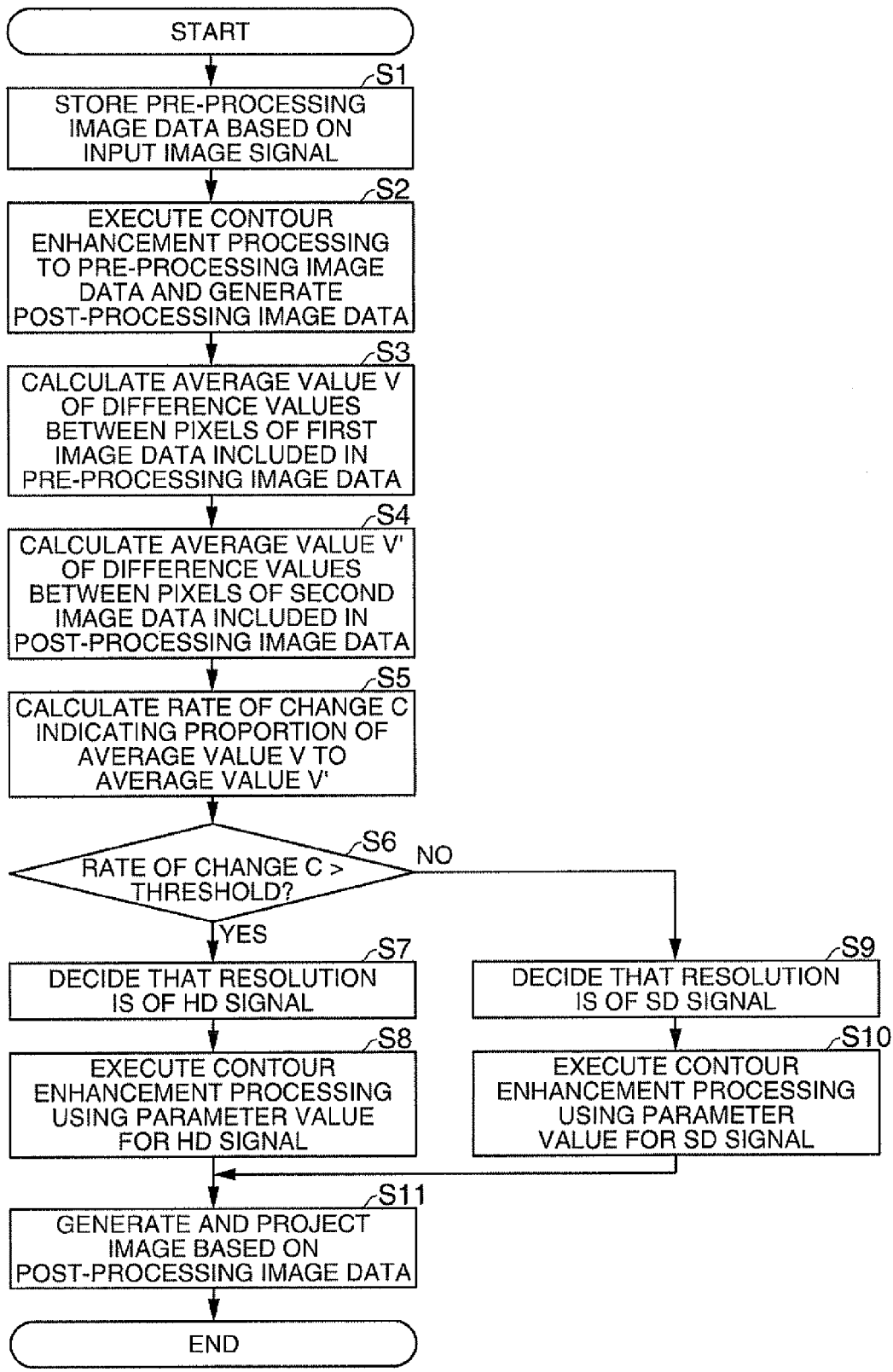
FIG. 2 is a flowchart showing procedures of image processing in the first embodiment.

Next, procedures for image processing in the first embodiment will be described. FIG. 2 is a flowchart showing the procedures for image processing in the first embodiment. In this embodiment, it is assumed that an image signal of 1080 p is inputted to the projector 100 from a blue-ray disk player as a kind of image supply device and then the projector 100 decides whether the original image has the resolution of an HD signal (Hi-Vision video signal) or the resolution of an SD signal (standard video signal) and executes contour enhancement processing according to the decision.

An image signal is supplied to the image signal input unit 110 from the blue-ray disk player and the update unit 122 stores the pre-processing image data 131 based on the image signal, in the storage unit 130 (step S1).

The contour enhancement processing unit 125 executes contour enhancement processing (sharpness correction) to the pre-processing image data 131 and thus generates the post-processing image data 135 (step S2).

The resolution deciding unit 126 calculates the average value V of the pixel values of pixels of the first image data 132 included in the pre-processing image data 131 (step S3) and calculates the average value V' of the pixel values of pixels of the second image data 136 included in the post-processing image data 135 (step S4).

Figure 3:
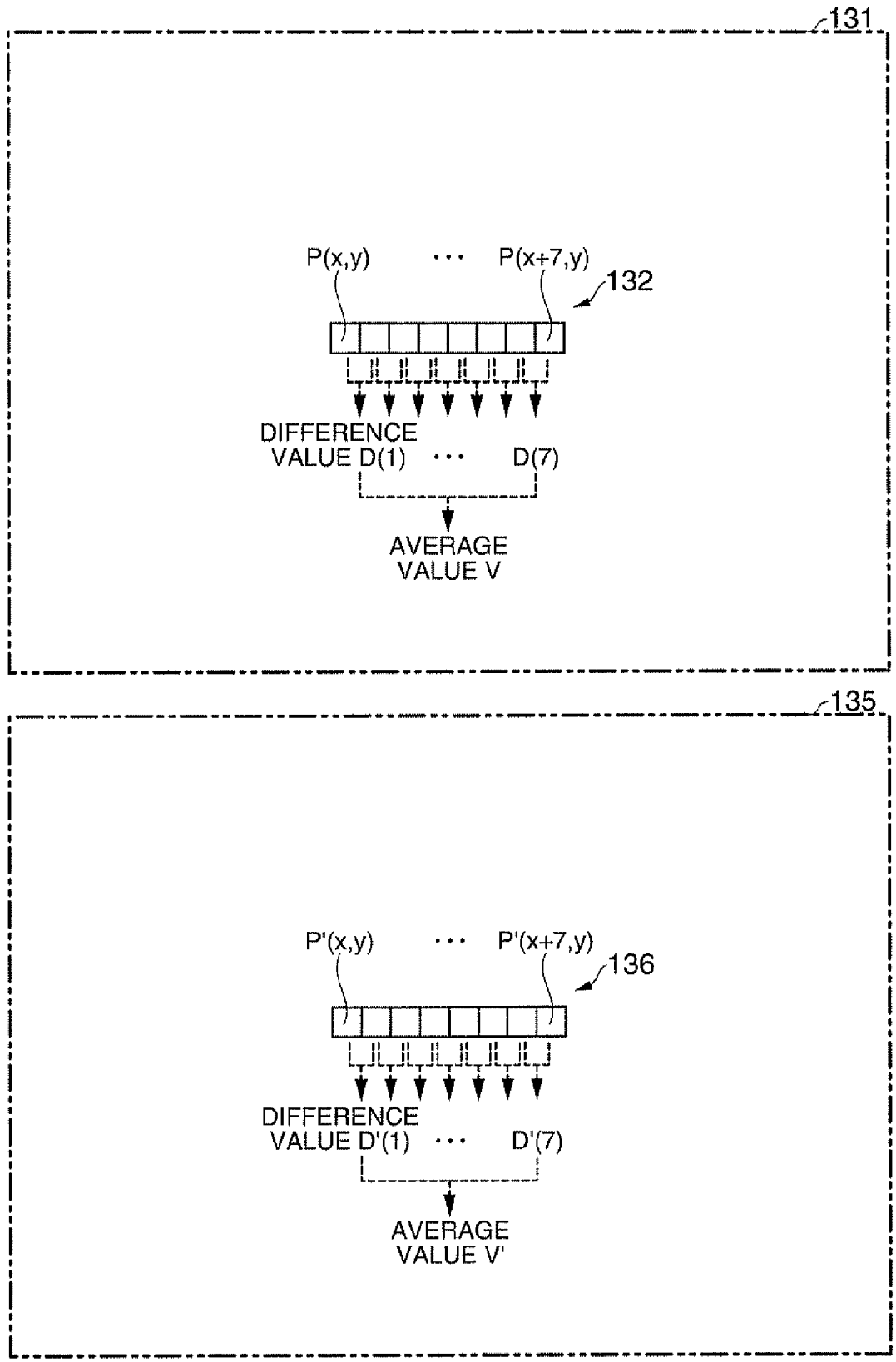
FIG. 3 is a schematic view showing a technique of calculating an average value using first image data and second image data in the first embodiment.

FIG. 3 is a schematic view showing a technique of calculating the average values using the first image data 132 and the second image data 136 in the first embodiment.

The first image data 132 is, for example, data representing the pixel values of 8 pixels in the horizontal direction at the center of the image expressed by the pre-processing image data 131. The resolution deciding unit 126 calculates the difference values D(1) to D(7) of the pixel values between neighboring pixels with respect to these pixels P(x, y) to P(x+7, y). The resolution deciding unit 126 then calculates the average value V of the difference values D(1) to D(7).

Similarly, the second image data 136 represents, for example, the pixel values of 8 pixels in the horizontal direction at the center of the image expressed by the post-processing image data 135. The resolution deciding unit 126 calculates the difference values D'(1) to D'(7) of the pixel values between neighboring pixels with respect to these pixels P'(x, y) to P'(x+7, y). The resolution deciding unit 126 then calculates the average value V' of the difference values D'(1) to D'(7). Each of the difference values D and the difference values D' may be an absolute value or a square value of the difference.

The resolution deciding unit 126 also calculates the rate of change C representing the proportion of the average value V to the average value V' (the value equal to V' divided by V) (step S5), and determines whether or not the rate of change C exceeds a threshold value (for example, 1.05 to 1.20 or the like). As this threshold value, an appropriate value can be selected based on the result of a simulation or experiment.

Figure 4:
FIG. 4 is a schematic view showing high and low frequencies of an image in the first embodiment.

FIG. 4 is a schematic view showing high and low frequencies of the image in the first embodiment. In FIG. 4, black circles and white circles indicate that their pixel values are significantly different. For example, it is now assumed that an image signal of 1080 p is inputted to the image signal input unit 110.

In the case where the blue-ray disk player outputs an image signal having the resolution of an HD signal recorded on a blue-ray disk, frequency components included in the image signal of 1080 p are generally high-frequency components. On the other hand, in the case where the blue-ray disk player up-converts an image signal having the resolution of an SD signal recorded on a DVD and outputs the up-converted image signal, frequency components included in the image signal of 1080 p are generally lower-frequency components than the frequency components included in the HD signal.

Particularly when contour enhancement processing is executed, the difference in the post-processing image data 135 with and without up-conversion is larger than in the pre-processing image data 131 before the execution of contour enhancement processing. That is, in the case of an image signal that is not up-converted, contour enhancement processing is executed to high-frequency data. Therefore, the processing has a significant effect and the rate of change C is high. On the contrary, in the case of an up-converted image signal, contour enhancement processing is executed to low-frequency data. Therefore, the processing has a less significant effect and the rate of change C is low.

If the rate of change C exceeds the threshold value, the resolution deciding unit 126 decides that the resolution of the original image is the resolution of the HD signal (step S7). The control unit 128 carries out control to cause the contour enhancement processing unit 125 to use the parameter values for the HD signal on the basis of the parameter data 138 and the contour enhancement processing unit 125 executes contour enhancement processing using the parameter values for the HD signal (step S8).

Meanwhile, if the rate of change C does not exceed the threshold value, the resolution deciding unit 126 decides that the resolution of the original image is the resolution of the SD signal (step S9). The control unit 128 carries out control to cause the contour enhancement processing unit 125 to use the parameter values for the SD signal on the basis of the parameter data 138 and the contour enhancement processing unit 125 executes contour enhancement processing using the parameter values for the SD signal (step S10).

The image quality improvement processing unit 124 may also execute, for example, gamma processing, noise reduction processing and the like, as well as contour enhancement processing by the contour enhancement processing unit 125. The parameter values may include, for example, a coefficient for contour enhancement, filter for contour enhancement (for example, a quadratic differential filter in the horizontal direction) and the like.

The projecting unit 190 generates an image based on the image data after the image processing by the image processing unit 120 and projects this image (step S11).

As described above, according to this embodiment, the projector 100 compares the image data before and after image quality improvement processing (in this embodiment, contour enhancement processing) and thus decides the resolution of the original image. The image quality improvement processing unit 124 is controlled according to the decided resolution. Thus, in a circumstance where an up-converted image signal can be inputted, appropriate image processing can be executed according to the image signal without making the user select the resolution of the original image.

For example, in the case where an image signal of 1080 p that is up-converted from a DVD image signal is inputted, in the commonly used technique, parameter values for the HD signal are used and therefore the effect of contour enhancement is insignificant, whereas in the technique of this embodiment, parameter values for the SD signal are used and therefore the effect of contour enhancement is significant and a more appropriate image is projected.

According to this embodiment, the projector 100 can decide the resolution of the original image simply by comparing the data before and after contour enhancement processing that is executed in normal image quality improvement processing. Therefore, the resolution of the original image can be decided efficiently with the simple configuration.

Moreover, according to this embodiment, the projector 100 uses the data of 8 pixels at the center of the image. Therefore, even in the case the original image includes subtitles or a black zone, the decision of the resolution of the original image or the like can be carried out appropriately and efficiently without being affected by the black zone or the like.

Other Embodiments

The application of the invention is not limited to the above embodiment and various modifications can be made. For example, the control unit 128 may perform feedback control of the image quality improvement processing unit 124 every several seconds by adjusting the parameter value of the target of use according to the result of the comparison between the first image data 132 and the second image data 136 by the resolution deciding unit 126.

According to this configuration, the projector 100 can further stabilize the output of the image processing unit 120 by performing feedback control of the image quality improvement processing unit 124. Therefore, even when the resolution of the original image changes, the output at the time of image processing can be stabilized.

The technique of feedback control may be, for example, PI control, PID control or the like. The decision of the resolution of the original image and the control according to the decision in the first embodiment may be executed at the time of the first input of the image signal or may be executed in the state where the image signal is stabilized with the lapse of a certain period of time after the image signal is inputted.

The pre-processing image data 131 and the post-processing image data 135 (the first image data 132 and the second image data 136) may be written over the same address in the frame memory or the like, or may be written at different addresses. If these image data are written over the same address, the occupancy in the storage unit 130 can be reduced. If these image data are written at different addresses, feedback control or the like can be executed more easily.

When controlling the image quality improvement processing unit 124, the control unit 128 may perform control to reach a target value immediately at the first time, or may perform control to reach a target value gradually.

The first image data 132 and the second image data 136 are not limited to the data of 8 pixels at the center of the image. For example, data of 16 pixels at the center of the image, data of plural pixels located one or more pixels away, and the like may be used. The first image data 132 may be the entire pre-processing image data 131. The second image data 136 may be the entire post-processing image data 135.

The resolution deciding unit 126 may also use, for example, a difference value or the like instead of the above-described rate of change, as the value indicating the difference between the first image data 132 and the second image data 136. In the above embodiment, the average value of difference values between neighboring pixels in the horizontal direction is used. However, the average value of difference values between neighboring pixels in the vertical direction may be used and the average value of the pixel values of individual pixels may also be used.

The first image data 132 and the second image data 136 compared by the resolution deciding unit 126 are not limited to the data before and after the processing by the contour enhancement processing unit 125, and may be, for example, data before and after processing by the noise reduction processing unit included in the image quality improvement processing unit 124. The resolution deciding unit 126 can decide the resolution of the original image, for example, by comparing the degree of decrease of high-frequency components due to cut-off by a low-pass filter in the noise reduction processing.

The resolution deciding unit 126 may also decide three or more resolutions at the same time (for example, decide an HD signal of 720 p in addition to the above resolutions). The resolution deciding unit 126 may also determine whether or not the input image signal represents a dynamic image or a still image on the basis of the average picture level (APL) or the like, then decide the above resolution if a still image continues for a predetermined time (for example, 10 seconds or the like) or longer, and decide the resolution of the original image as the resolution of the HD signal until the predetermined time passes after the still image is inputted. Thus, the projector 100 can prevent erroneous determination of the resolution in cases such as where a menu image or the like is temporarily displayed.

The projector 100 may also allow the user to select whether to automatically decide the above resolution or not, and may allow the user to select the above threshold value. The resolution deciding unit 126 may also decide the resolution in accordance with this selection.

A computer having the projector 100 may read a program stored in an information storage medium and thus function as the resolution deciding unit 126 or the like. As such an information storage medium, for example, a CD-ROM, DVD-ROM, ROM, RAM, HDD or the like can be used.

The projector 100 is not limited to the liquid crystal projector (transmitting type, or reflection type such as LCOS) and may be, for example, a projector using a digital micro mirror device or the like. The functions of the projector 100 may be dispersed to plural devices (for example, a PC, projector and the like).

The image display apparatus is not limited to the projector 100 and may be, for example, a television unit, liquid crystal monitor or the like. The image processing apparatus is not limited to the image processing unit 120 in the projector 100 and may be, for example, a personal computer (PC), HDD recorder or the like.

What is claimed is:

1. An image processing apparatus comprising:
    an image quality improvement processing unit which is supplied with an image signal corresponding to an original image from an image supply device, executes image quality improvement processing to first image data based on the image signal and thus generates second image data;
    a resolution deciding unit which compares the first image data with the second image data and thus decides whether a resolution of the original image is a resolution of a high definition (HD) signal or a resolution of a standard definition (SD) signal; and
    a control unit which controls the image quality improvement processing unit according to the resolution of the original image decided by the resolution deciding unit and thus adjusts the image quality improvement processing,
    wherein the resolution deciding unit determines whether a value representing a difference between a pixel value of a pixel group near the center of an image included in the first image data and a pixel value of a pixel group near the center of an image included in the second image data exceeds a threshold value or not, and decides that the resolution of the original image is the resolution of an HD signal if the value representing the difference exceeds the threshold value, and decides that the resolution is the resolution of an SD signal if the value representing the difference does not exceed the threshold value, and
    the control unit controls the image quality improvement processing unit so as to use a parameter value for an HD signal if the resolution of the original image is the resolution of the HD signal, and to use a parameter value for an SD signal if the resolution of the original image is the resolution of the SD signal.

2. The image processing apparatus according to claim 1, wherein the control unit controls the image quality improvement processing unit so as to use a parameter value corresponding to the resolution decided by the resolution deciding unit.

3. The image processing apparatus according to claim 2, wherein the control unit performs feedback control of the image quality improvement processing unit by adjusting a parameter value of a target of use according to the result of the comparison between the first image data and the second image data by the resolution deciding unit.

4. The image processing apparatus according to claim 1, wherein the image quality improvement processing unit includes a contour enhancement processing unit which executes contour enhancement processing, and the contour enhancement processing unit generates the second image data by executing the contour enhancement processing to the first image data.

5. An image display apparatus comprising:
the image processing apparatus according to claim 1; and
a display unit which displays an image in the state where the image quality improvement processing is executed.

6. An image processing method in an image processing apparatus including an image quality improvement processing unit which performs image quality improvement processing to inputted image data, the method comprising:
having an image signal corresponding to an original image supplied to the image quality improvement processing unit from an image supply device;
executing the image quality improvement processing to first image data based on the image signal by the image quality improvement processing unit and thus generating second image data;
comparing the first image data with the second image data and thus deciding whether a resolution of the original image is a resolution of a high definition (HD) signal or a resolution of a standard definition (SD) signal; and
controlling the image quality improvement processing unit according to the decided resolution and thus adjusting the image quality improvement processing,
wherein it is determined whether a value representing a difference between a pixel value of a pixel group near the center of an image included in the first image data and a pixel value of the pixel group included in the second image data exceeds a threshold value or not,
if the value representing the difference exceeds the threshold value, it is decided that the resolution of the original image is the resolution of an HD signal, and if the value representing the difference does not exceed the threshold value, it is decided that the resolution is the resolution of an SD signal, and
the image quality improvement processing unit is controlled so as to use a parameter value for an HD signal if the resolution of the original image is the resolution of the HD signal, and to use a parameter value for an SD signal if the resolution of the original image is the resolution of the SD signal.

7. The image processing method according to claim 6, wherein the image quality improvement processing unit is controlled so as to use a parameter value corresponding to the resolution of the original image that is decided.

8. The image processing method according to claim 7, wherein a parameter value of a target of use is adjusted according to the result of the comparison between the first image data and the second image data, thereby performing feedback control of the image quality improvement processing unit.

9. The image processing method according to claim 6, wherein the image quality improvement processing includes contour enhancement processing, and
the contour enhancement processing is executed to the first image data, thereby generating the second image data.

* * * * *